May 21, 1935.  H. F. PARKER  2,001,936
BRAKE
Filed July 26, 1929
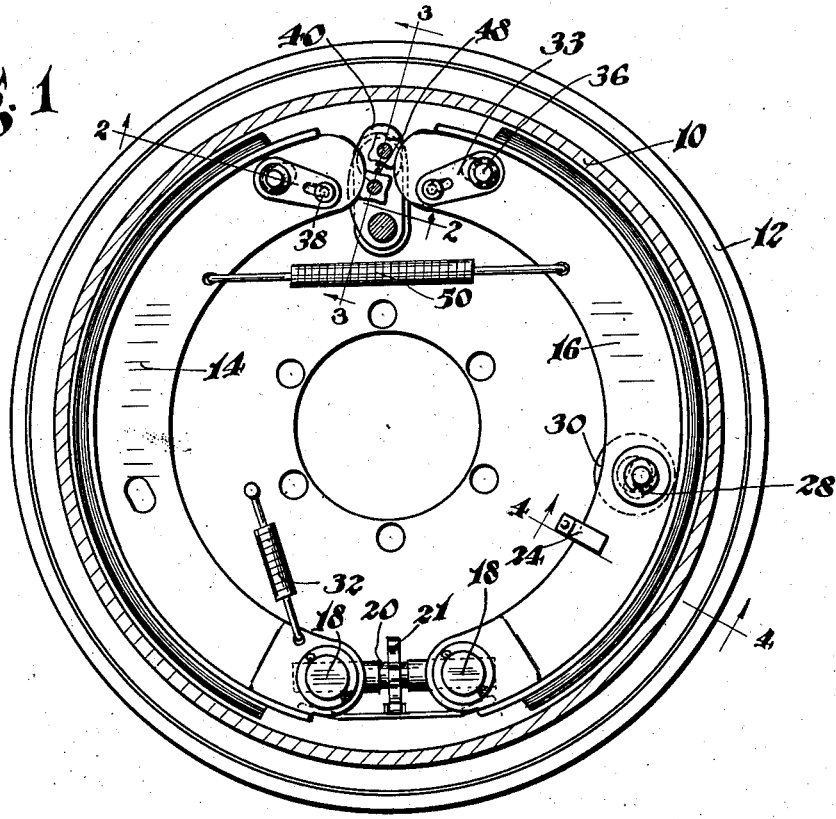
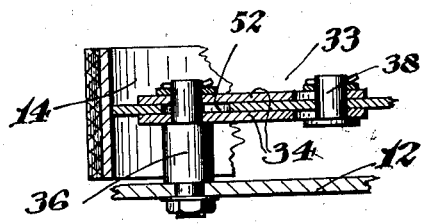
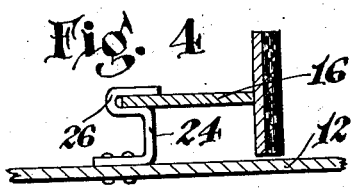
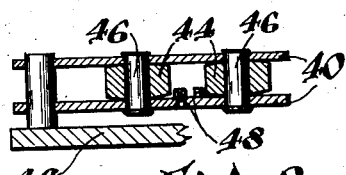
INVENTOR
Humphrey F. Parker
BY H. O. Clayton
ATTORNEY Patented May 21, 1935

2,001,936

UNITED STATES PATENT OFFICE 2,001,936

BRAKE

Humphrey F. Parker, South Bend, Ind., assignor to Bendix Brake Company, South Bend, Ind., a corporation of Illinois Application July 26, 1929, Serial No. 381,195

1 Claim. (Cl. 188—78)

This invention relates to brakes and is illustrated as embodied in an internal expanding automobile brake of the type having one part which anchors when the drum is turning in one direction and a different part which anchors when the drum is turning in the other direction. The invention is furthermore directed to a full wrapping brake, that is one wherein practically 360° of brake lining contact the rotating drum, being wedged into engagement therewith by the wiping effect of the drum augmented by the action of the cam or other applying means.

With brakes of this type it is the practice to provide a considerable lining clearance in the release position and when the torque is taken at the ends of the brake, as is disclosed in my preferred embodiment, a considerable freedom of movement of the ends is of decided advantage, in that it permits the extreme ends of the brake lining to fully and effectively engage the drum when the brake is applied. I suggest that the above object be effected by anchoring the full wrapping brake at both of its ends through the intermediary of links, a single link being placed at each end of the brake. A further and important feature of the invention resides in so constructing and positioning the anchor links as to place the same in a condition of tension when performing their function of taking the braking torque.

I further propose to so position the tensioned anchoring links that the same serve to effectively thrust the extreme heel end of the brake into drum contact, and in the brake illustrated each link is pivoted at one end to a stationary anchor post and its other and forward end is preferably slotted to receive a thrust pin fixed in the body of the friction means. Each link is further inclined to the horizontal to insure that the friction means, such as a band or shoe, will be wedged into drum contact, fulcruming about the aforementioned thrust pin.

Other features of the invention relate to refinements in a novel cam, which refinements includes novelly constructed stops for limiting movement of the shoe contacting portion of the cam; to a novel combined guide and steadying means for the friction element of the brake and to other desirable details of construction which will be apparent from the following description of the illustrative embodiments shown in the accompanying drawing, in which:

Figure 1 is a vertical section through the brake just inside the head of the brake drum and showing the brake in side elevation;

Figure 2 is a section taken on the line 2—2 of Figure 1 through the novel tension link anchor structure;

Figure 3 is a partial section through the brake applying means taken on the line 3—3 of Figure 1; and Figure 4 is a section taken on the line 4—4 of Figure 1 disclosing the novel combined steady rest and guide.

The illustrated brake includes a rotatable drum 10 at the open side of which is a support such as a backing plate 12 and within which is arranged the friction means of the brake. This friction means preferably includes a pair of novel interchangeable shoes 14 and 16 and transverse pivots 18 at their lower ends threaded to receive right and left threaded rotatable adjustable connection 20 having a central ratchet collar 21 formed with radial openings to receive a tool such as a nail or screw-driver inserted through an opening in the backing plate.

According to one feature of my invention, the backing plate may be provided with a combined steady rest and guide means 24, disclosed in Figure 4, and which may comprise an S-shaped stamping having a U-portion 26 defining a channel receiving the moving web of the friction means. The stamping 24 thus functions to guide the friction means in its movement about the drum and furthermore obviates lateral movement thereof.

The shoe 16 is preferably provided with a novel eccentric stop 28 adjustably mounted in the backing plate and operable from outside the backing plate and having a stop roller 30 engaging the inner face of the shoe rim. The details of this eccentric stop form no part of the invention claimed herein, the same being the invention of Ludger E. La Brie described and claimed in his application No. 304,196, filed September 6, 1928. The shoe 16 may be urged against the adjustable stop roller 30 of the eccentric 28 when the brake is released, by means such as a spring 32 inclined at such an angle as to act through the connection 20 to urge the shoe 16 away from the drum. Spring 32 also serves to force the web of the shoe into contact with the guide clip 24.

According to an important feature of the invention, the ends of the shoes or their equivalents are provided with my novel anchoring links 33 which may comprise stampings 34 on either side of the web of the friction means, which stampings are pivoted at their outer ends to a fixed pivot post 36 detachably secured to the backing plate 12. At their inner or forward ends the stampings, which together form the aforementioned link, are preferably longitudinally slotted to receive a pivot pin 30, which pin is passed through the web of the friction means having a driving fit therewith. The brake is applied by means of a novel cam comprising spaced parallel stampings 40 pivoted at their lower ends to a crank arm 42 on the end of a shaft (not shown) which is journaled in the backing plate. Square-shaped thrust blocks 44 are rotatably mounted on pins 46 mounted in the cam plates 40. These thrust blocks 44 are slightly concave of face to receive the rounded ends of the web of the friction means, all as clearly disclosed in Figure 1.

According to an important minor feature of the invention, the thrust blocks 44 are prevented from turning to any substantial degree by means of novelly formed stops 48 pressed inwardly by a step punch from the face of the cam plates 40 the sheared metal being preferably rectangularly shaped on the inner side by a suitable die. These novelly formed stops obviate any substantial swivelling movement of the blocks 44 to prevent the corners of the same contacting the rounded ends of the shoes. This construction insures that the concave sides of the blocks will at all times remain in thrust engagement with the ends of the friction means.

In operation of the brake the cam is rotated, against the resistance of the spring 50 secured to the webs of the shoes, thrusting the ends of the shoes apart into engagement with the rotating drum. The shoes are, in this movement, guided by the pins 38 moving along the slots in the links. Once into drum contact, one or the other of the shoes 14 and 16 is wiped around the drum, the particular shoe which is given this action being determined by the direction of rotation of the drum. The one shoe functions to move the other into drum engagement through the connection 20, the latter shoe, for example 16 Figure 1, moving around the drum until its pin 38 contacts the end of the slot in the link. With further pressure of the applying means and the wiping action of the drum, the link tends to move upwardly from its lower end, as shown in Figure 1, anchoring the shoe 16 together with the shoe 14, on the fixed pivot 36. The extreme end of the shoe 16 is thus wedgingly forced into drum contact, the link 33 taking the braking torque and being placed under a condition of tension. With the drum turning clockwise, shoe 14 functions in the same manner as just described with respect to the shoe 16. The webs of the shoes 14 and 16 are slotted at 52 to permit the aforementioned movement of the shoe and when the brake is released the return spring 50 functions to pull the ends of the shoes together, the tops of the slots 52 contacting the fixed anchors 36 to determine the released position of the shoes.

By this construction I have provided a full wrapping type of brake, whose anchor structure is such as to insure that all of the lining area will be forced into full drum contact and this anchor construction furthermore insures that the friction means will be fully released from drum contact.

While one illustrative embodiment has been described in detail, it is not my intention to limit the scope of the invention to that particular embodiment or otherwise than by the terms of the appended claim.

I claim:

A brake applying device including a thrust member having an arm on which it is pivoted, said arm having a stop holding the thrust member from turning.

HUMPHREY F. PARKER.